US010004022B2

(12) United States Patent
Kalhan et al.

(10) Patent No.: US 10,004,022 B2
(45) Date of Patent: Jun. 19, 2018

(54) HANDOVER SIGNALING USING AN MBSFN CHANNEL IN A CELLULAR COMMUNICATION SYSTEM (71) Applicant: Kyocera Corporation, Kyoto (JP)

(72) Inventors: Amit Kalhan, San Diego, CA (US); Henry Chang, San Diego, CA (US); Douglas Dunn, San Diego, CA (US); David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 446 days.

(21) Appl. No.: 14/358,354

(22) PCT Filed: Nov. 12, 2012

(86) PCT No.: PCT/US2012/064708
§ 371 (c)(1),
(2) Date: May 15, 2014

(87) PCT Pub. No.: WO2013/074461
PCT Pub. Date: May 23, 2013

(65) Prior Publication Data
US 2014/0314047 A1 Oct. 23, 2014

Related U.S. Application Data (60) Provisional application No. 61/559,848, filed on Nov. 15, 2011.

(51) Int. Cl.
H04W 4/00 (2018.01)
H04W 36/38 (2009.01)
H04W 36/00 (2009.01)

(52) U.S. Cl.
CPC ....... *H04W 36/38* (2013.01); *H04W 36/0072* (2013.01); *H04W 36/0088* (2013.01); *H04W 36/0011* (2013.01)

(58) Field of Classification Search
CPC ..................................... H04W 36/38
See application file for complete search history.

(56) References Cited

U.S. PATENT DOCUMENTS

| 6,711,408 B1 | 3/2004 | Raith | |
|---|---|---|---|
| 2008/0225796 A1* | 9/2008 | Malladi | H04W 72/1284 370/331 |

(Continued)

FOREIGN PATENT DOCUMENTS

| EP | 1 819 186 | 8/2007 |
|---|---|---|
| EP | 2 302 969 | 3/2011 |

(Continued)

OTHER PUBLICATIONS

"Guidelines for using cdma2000 1x Revision E Features on Earlier Revisions"; 3rd Generation Partnership Project 2, TSG-C; 3GPP2 C.S0099-0; Version 2.0; Jul. 2011.

(Continued)

*Primary Examiner* — Mohammad Anwar
*Assistant Examiner* — Angel Brockman (57) ABSTRACT A method of handover signaling in a cellular communication system is disclosed. Prior to a user equipment (UE) undergoing a cell-to-cell transition, a target node transmits handover-related signaling in one or more Multicast Broadcast Single Frequency Network (M8SFN) subframes in order to reduce handover delay. The cellular communication system includes a source node configured to transfer a handover (HO) request to the target node. The (HO) request corresponds to a (UE) presently being served by the source node. The target node is configured to transmit (HO) information to the (UE) over at least one MBSFN subframe in response to the (HO) request.

20 Claims, 4 Drawing Sheets (56) References Cited

U.S. PATENT DOCUMENTS

| | | | |
|---|---|---|---|
| 2008/0268833 A1* | 10/2008 | Huang | H04B 7/024 455/425 |
| 2008/0318578 A1 | 12/2008 | Worrall | |
| 2009/0129341 A1* | 5/2009 | Balasubramanian | H04W 36/0055 370/331 |
| 2009/0156225 A1* | 6/2009 | Angelow | H04J 11/0093 455/450 |
| 2009/0201881 A1 | 8/2009 | Chun et al. | |
| 2009/0252077 A1 | 10/2009 | Khandekar et al. | |
| 2009/0312008 A1 | 12/2009 | Lindoff et al. | |
| 2010/0008282 A1 | 1/2010 | Bhattad et al. | |
| 2010/0272004 A1* | 10/2010 | Maeda | H04L 5/0007 370/312 |
| 2010/0315963 A1* | 12/2010 | Jading | H04J 11/0093 370/252 |
| 2011/0190011 A1 | 8/2011 | Choi et al. | |
| 2011/0294508 A1 | 12/2011 | Min et al. | |
| 2013/0028161 A1 | 1/2013 | Maeda et al. | |
| 2013/0040691 A1 | 2/2013 | Ode et al. | |
| 2014/0293858 A1 | 10/2014 | Kalhan et al. | |
| 2014/0034805 A1 | 11/2014 | Kalhan et al. | |

FOREIGN PATENT DOCUMENTS

| | | |
|---|---|---|
| WO | WO 2008/118064 | 10/2008 |
| WO | WO 2008/134554 | 11/2008 |
| WO | WO 2008/135933 | 11/2008 |
| WO | WO 2008/157717 | 12/2008 |
| WO | WO 2009/113918 | 9/2009 |
| WO | WO 2011/135693 | 11/2011 |
| WO | WO 2011/135825 | 11/2011 |
| WO | WO 2013/074457 | 5/2013 |
| WO | WO 2013/074458 | 5/2013 |
| WO | WO 2013/074460 | 5/2013 |

OTHER PUBLICATIONS

"Femtocell activities in 3GPP2 TSG-C"; Tiedemann, Edward G; Mar. 31, 2009; New Orleans, LA; XP002606265.

"Service Information Exchange for MBMS Service Continuity"; Alcatel Lucent et al.; 3GPP TSP-RAN WG3 Meeting #74; San Francisco, CA; Nov. 2011.

* cited by examiner

HANDOVER SIGNALING USING AN MBSFN CHANNEL IN A CELLULAR COMMUNICATION SYSTEM

CLAIM OF PRIORITY

The present application claims priority to Provisional Application No. 61/659,848 entitled "Handover Signaling in MBSFN Subframe," filed Nov. 15, 2011, and assigned to the assignee hereof and hereby expressly incorporated by reference.

REFERENCE TO CO-PENDING APPLICATIONS FOR PATENT

The present application relates to PCT Application No. PCT/US2012/064704, entitled "Node Detection in a Cellular Communication Network," filed concurrently with this application, and assigned to the assignee hereof and expressly incorporated by reference herein; to PCT Application No. PCT/US2012/064700, entitled "Handover Management Using a Broadcast Channel in a Network Having Synchronized Base Stations," filed concurrently with this application; and to PCT Application No. PCT/US2012/064707, entitled "Inter-cell Messaging Using MBSFN Subframe," filed concurrently with this application, and assigned to the assignee hereof and expressly incorporated by reference herein.

TECHNICAL FIELD

The present disclosure generally relates to wireless communications, and more particularly, to cellular networks.

BACKGROUND

In cellular communications, the term handover or handoff refers to the process of transferring an ongoing call or data session from one channel connected to the core network to another. A basic form of handover is when a phone call in progress is redirected from its current ceil (called a source) to a new ceil (called a target). Such a handover, in which the source and the target are different cells is called an inter-cell or cell-to-cell handover. The purpose of cell-to-cell handover is to maintain the call as the user is moving out of the area covered by the source cell and entering the coverage area of the target cell.

Cellular network operational standards specific cell handover protocols. For example, the Long-term Evolution (LTE) specifies certain handover protocols. In a standard LTE handover procedure, after a user equipment (UE) reports a target cell (or node) downlink (DL) signal quality to Us source node, the source node makes a handover decision. If a handover is to occur, the source node acquires all the relevant information from the target node and delivers it to the UE. This information helps a UE to initiate a Random Access (RACH) process to acquire synchronization with the target node. Subsequently, the target node sends ill allocation and UL timing adjustment to the UE. After receiving the above information, the UE responds with a RRC (Radio Resource Control) Connection Reconfiguration Complete message and the handover is completed.

Although the standard handover procedure described above is adequate in most scenarios, handover failures (HOF) and radio-link failures (RLF) do occur during handover regions, especially when nodes are newly deployed. In some cases the HOF/RLF can be avoided if the handover delay is minimized. For example, this is the case with mobility in a hetrogeneous network in scenarios where a UE approaches a small cell (e.g., picocell or femtocell) at high or at least medium speed. In these circumstances, the UE may experience HOF due to handover delay. Although certain mobility parameters (e.g., Time-to-Trigger) may foe adjusted to compensate for the speed of the UE, some mobility parameters are not cell specific and cannot be adjusted fast enough to accommodate certain operational needs. To resolve these issues and possibly others, a more compact handover procedure is needed with reduced handover delay.

SUMMARY

This summary is not an extensive overview of all contemplated embodiments, and is intended to neither identify key or critical elements of all embodiments nor delineate the scope of any or all embodiments, its sole purpose is to present some concepts of one or more embodiments in a simplified form as a prelude to the more detailed description that is presented later.

Disclosed herein is an improved technique for reducing the handover delay and signaling overhead in a cellular communication system when user equipment undergoes a cell-to-cell transition. Prior to a UE undergoing a cell-to-cell transition, a target node transmits handover-related signaling in one or more Multicast Broadcast Single Frequency Network (MBSFM) subframes in order to reduce handover delay. The terms "node" and "cell" are used interchangeably herein. The cellular communication system includes a source node configured to transfer a handover (HO) request to the target node. The HO request corresponds to a UE presently being served by the source node. The target node is configured to transmit HO-specific information directly to the UE over at least one MBSFN subframe in response to the HO request.

Other aspects, features, advantages of the foregoing technique will be or will become apparent to one with skill in the art upon examination of the following figures and detailed description. It is intended that all such additional aspects, features, and advantages be included within this description and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, where appropriate to avoid obscuring the invention, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Current LTE handover procedures assume that the source cell and the target cell are unsynchronized. As a result, known LTE handover procedures require that a UE obtain all handover related information from the target cell through the source cell, obtain synchronization with the target cell, and then complete the handover procedure with the target cell.

However, more and more functionalities today require that cells are synchronized. The primary example of synchronized cell operation is the support of MBMS (Multimedia Broadcast Multicast Service). In order to broadcast the same information from all the cells a relatively new type of transmission mode is introduced in LTE (Release 9), called Multicast Broadcast Single Frequency Network (MBSFN). The MBSFN transmissions from the multiple cells are tightly synchronized so that the transmissions from multiple cells appear to a UE as a transmission from a single large cell. Although MBSFN is primarily used for MBMS, the current LTE specification does allow the unused MBSFN subframes for unicast transmission. This allows each cell to send UE-specific and/or cell-specific information (messages or data) over MBSFN subframes that the UE is already monitoring. The MBSFN subframes are semi-static and predetermined. The handover procedures described herein incorporate nodes that are configured to transmit handover information in MBSFN subframes and UEs that use and monitor UE-specific handover information contained in MBSFN subframes.

Essentially, the HO processes disclosed herein initiate HO process earlier, while the UE is still in the neighboring cell coverage, by delivering necessary HO messages to the UE in MBSFN subframes. Neighboring nodes may monitor the sounding reference signal (SRS) from UEs that are located at cell-edges. This monitoring can be initiated when a UE transmits a measurement report to the source node, and in turn, the source node sends an HO request to the target node.

Using MBSFN subframes to unicast UE-specific handover information allows the target node to begin the handover process while the UE is still in the source node coverage and consequently reduce the handover delay, thus increasing the reliability and success rate of the handover procedure.

Figure 1:
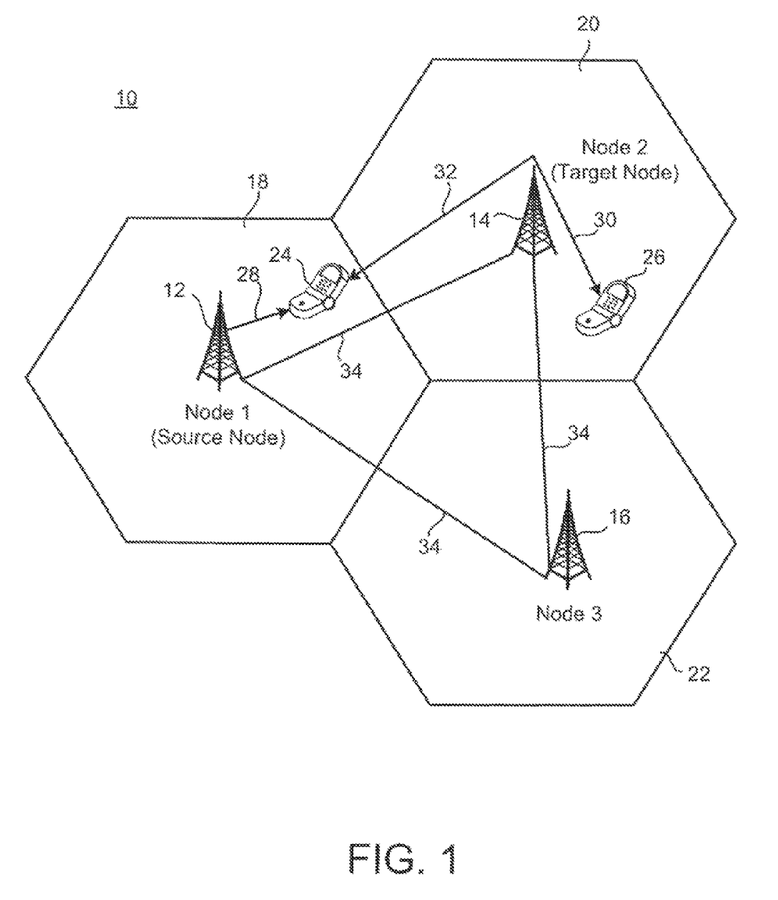
FIG. 1 illustrates an exemplary cellular communication system.

FIG. 1 illustrates an exemplary cellular communication network 10 including plural nodes 12, 14, 16 and UEs 24, 26. The terms "system" and "network" are used interchangeably in this disclosure. Node one 12 (the source node) provides services in a first coverage area 18. As shown, a first UE 24 receives services from node one 12, including MBSFN subframe downlink (DL) transmissions 28. The first UE 24 may also receive MBSFN subframe transmissions 32 from node two 14 (the target node). Node two 14 provides services in a second coverage area 20. As shown, a second UE 26 receives services from node two 14, including MBSFN subframe DL transmissions 30. Node three 18 provides services in a third coverage area 22. The nodes 12, 14, 18 may communicate with each other over a backhaul network 34, including over the X2 interface or via the core network. Although only two UEs 24, 28 and three nodes 12, 14, 18 are shown, the network 10 may include any suitable number of UEs and nodes.

The network 10 may be a 3GPP LTE network and nodes 12, 14, 16 may be evolved Node Bs (eNBs). The network 10 can include other network entitles as well, for example, one or more network control entities. The Third-Generation Partnership Project Long-Term Evolution (3GPP LTE) communication specification is a specification for systems where base stations (eNBs) provide service to mobile wireless communication devices (UEs) using orthogonal frequency-division multiplexing (QFDM) on the downlink and single-carrier frequency-division multiple access (SC-FDMA) on the uplink. Although the techniques described herein may be applied in other types of communication systems, the exemplary network 10 discussed herein operates in accordance with a 3GPP LTE communication specification.

An eNB communicates with the UEs in the network and may also be referred to as a base station, a Node B, an access point or the like. Each eNB 12, 14, 18 may provide communication coverage for a particular geographic area. To improve network capacity, the overall coverage area of an eNB may be partitioned into multiple smaller areas. In 3GPF, the term "cell" can refer to the coverage area of an eNB and/or an eNB serving a smaller partition such as pieocell or femtocell.

An eNB may provide communication coverage for a macro cell, a pico cell, a femto cell, and/or other types of cells. As depicted in FIG. 1, the nodes 12, 14, 18 are each a macro node that covers a macro cell that may span a relatively large geographic area (e.g., several kilometers in radius) and may allow network access to UEs with service subscriptions. However, the nodes 12, 14, 18 may be other types of nodes, such as pico, femto nodes or a combination of various node types. A pico cell may cover a smaller geographic area than a macro cell. A home node, also referred to as a femto node, may cover a femto cell, which is a relatively small geographic area (e.g., about the size of a residence) and may allow access by UEs having association with the femto cell, e.g., user UEs in a home, user UEs subscribing to a special service plan, or the like.

A home eNB facilitates wifeless communication over a licensed cellular radio band, as opposed to an unlicensed band, utilized by wireless local area network (WLAN) routers. A home eNB may be installed in a user's home and provide indoor wireless coverage to UE using existing broadband Internet connections. Such personal miniature base stations are also known as access point (AP) base stations. Typically, such miniature base stations are connected to the Internet and the mobile operator's network via Internet protocol (IP) communication over a DSL router or cable modem.

As shown in FIG. 1, the UE 24 located within the source node coverage area 18 can receive MBSFN subframes 32 from the neighboring target node 14. During MBSFN subframes transmissions the target node 14 is allowed to increase transmit power (if needed) so that its downlink (DL) can reach into the other cell coverage area 18. This allows the target node 14 to serve UEs, which are at or outside the target cell boundary, but still located within source node cell coverage area 18.

Based on a scheme, including those described below in reference to FIGS. 5-8, each node 12, 14, 18 may transmit its own MBSFN subframes to transmit UE-specific or cell-specific messages to UEs in neighboring cells. As described below, in order to avoid interference, orthogonal sets of MBSFN resources can be assigned to each node. This allows nodes to transmit unicast or UE-specific data (e.g., HO messages) to UEs outside the transmitting node's coverage area.

Nodes one, two and three 12, 14, 18 can be synchronized to the cellular network 10 to transmit MBSFN subframes on the same frequency at the same time. In other words, they can be in the same MBSFN. Based on the techniques described herein, including those methods described in reference to FIGS. 5-8, a neighboring node can unicast/multicast node-specific and/or UE-specific information in MBSFN subframe data regions to a UE located in another cell or its own cell. The other cell may be an E-UTRAN cell, for example.

Each of the UEs 24, 28 may also be referred to as a terminal, mobile station, mobile device, subscriber unit, station, wireless communication device, or the like. Each UE 24, 28 may be a cellular phone, smart phone, a personal digital assistant (PDA), a wireless modem, a laptop computer, a cordless phone, or the like. The UEs 24, 26 can include one or more additional RF transceivers so that they can communicate with nodes that use different radio access technologies (RATs). For example, in addition to the cellular WWAN interface, the UE can include a WLAN interface, such as an IEEE 802.11 Wi-Fi air interface.

The UEs 24, 26 communicate with the nodes 12, 14, 16 via downlinks (DL) and uplinks (UL). The downlink (or toward link) refers to the communication link from the node to the UE, and the uplink (or reverse link) refers to the communication link from the UE to the node. In FIG. 1, the solid lines 28, 32 indicate transmissions between the UEs 24, 26 and their respective serving node 12, 14. A serving node is a node presently designated to serve a UE on the downlink and/or uplink.

When a UE is close to the edge of its serving node's coverage area, an adjacent neighboring node can transmit node-specific HO information or UE-specific information in one or more MBSFN subframes to the nearby UE. To accomplish this, the neighboring node can transmit node-specific {cell-specific} information about itself, such as its earner-frequency, cell-ID, transmit power, and the like, in the data regions of the MBSFN subframes. The cell-specific data can be included in the MBSFN subframe(s) so as not to interfere with MBSFN transmissions from other nodes by using the techniques described below, including those described in reference to FIGS. 5 and 6. UE-specific information includes information corresponding to and/or selected for delivery to one or more particular UEs, and may include HO and signaling information and/or node-specific information.

Illustrating this operation in FIG. 1, target node 14 is shown transmitting one or more MBSFN subframes 32 to the first UE 24 in the source node coverage area 18.

Although FIG. 1 describes a specific network configuration, the techniques disclosed herein are not limited to the specific example and can readily be applied to other networks. For example, the network 10 may take other forms, such as a heterogeneous network that includes nodes of different types, e.g., macro eNBs, pico eNBs, femto eNBs, WLAN APs, and/or the like. These different types of nodes may have different transmit power levels, different coverage areas. The network 10 may also include different numbers of elements, e.g., more or fewer nodes and/or UEs, than those shown in the figures, and may use different radio access technologies than those described.

Figure 2:
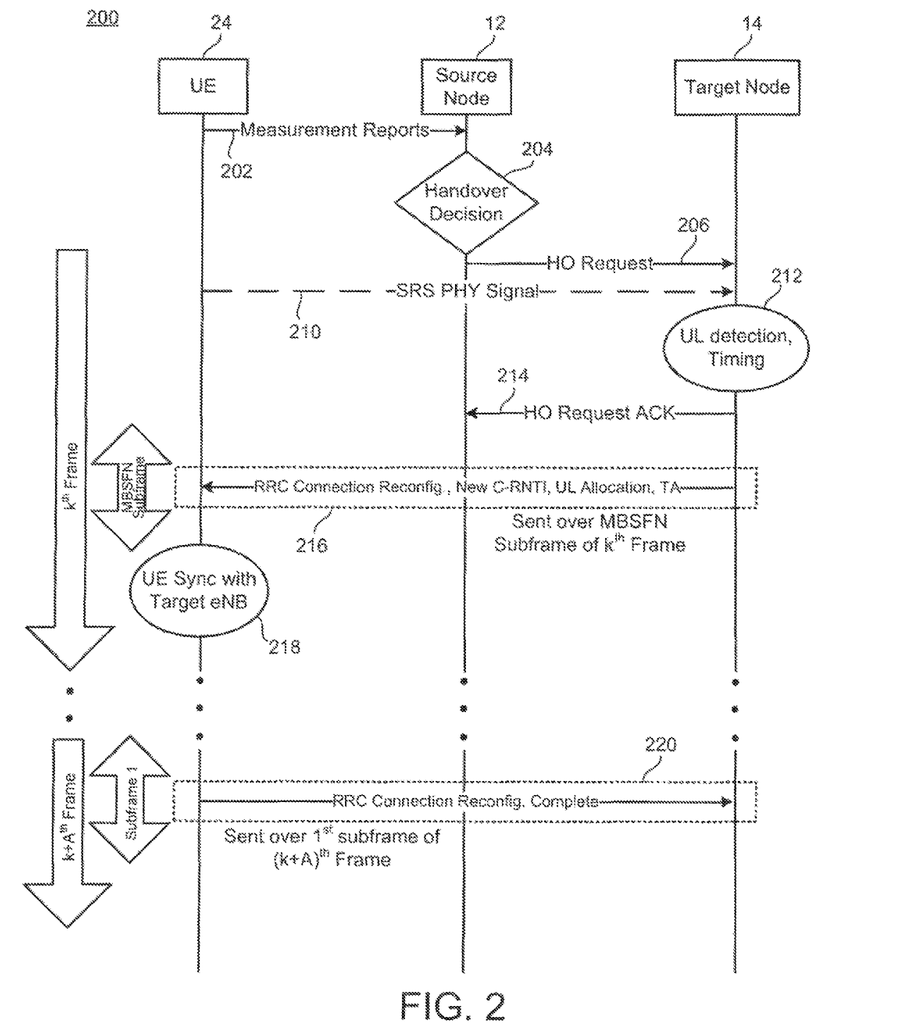
FIG. 2 is a signal flow diagram illustrating an exemplary handover procedure relying on inter-cell messages contained in one or more MBSFN subframes.

FIG. 2 is a signal flow diagram 200 illustrating an exemplary handover procedure relying on inter-cell HO messages contained in one or more MBSFN subframes transmitted between a target node 14 and a UE 24. The procedure can be deployed in the network 10.

The diagram 200 shows LTE signal flows between the UE 24, a source node 12 and the target node 14. The UE 24 can be any of the UEs disclosed in this document. The source node 12 is a node that is presently providing services to the UE 24, and may be an eNB. The target node 14 is a node that is not presently providing services to the UE 24, and may be, for example, an adjacent node in the cellular network. The source and target nodes 12, 14 may be eNBs.

The HO process starts by the UE 24 sending one or more measurement reports 202 to the source node 12. The measurement reports include at least the reference symbol received power (RSRP) and the carrier received signal strength indicator (RSSI), i.e., the measured power levels of transmissions between the target node 12 and the UE 24.

In response to the measurement reports 202, the source node 12 makes a handover decision 204 based on the reports. In making the decision, the source node 12 may identify the strongest neighboring nodes corresponding to the UE 24 when, for example, the node 12 determines that the UE 24 is nearing an edge of the serving node's coverage area (cell). The information identifying the strongest neighbor may be programmed info the source node 12 so that it is known to the node 12 a priori, it may be received by the node 12 over the backhaul network from the network control entity, for example, or it may be determined from neighboring node RF signals measured by the node 12.

If the source node 12 determines that the UE 24 should undergo a cell-to-cell handover, a handover (HO) request 206 is transferred to the target node 14 from the source node 12. The HO request 208 can include Cell Radio Network Temporary Identifier (C-RNTI) and sounding reference signal (SRS) information about the UE 24,_UL allocation or other information. The information is sufficient to permit the target node 14 to monitor the PHY signals from the UE 24. Alternatively, the target node 14 may obtain the SRS, C-RNTI and/or related information about the UE 24 by polling the source node 12, or the source node 12 can share this information autonomously with its neighboring nodes.

After receiving the information, the target node 14 begins monitoring SRS PHY signals 210 emitted from the UE 24, based on the information it received. The target node 14 can detect the UE 24 by detecting SRS or any other uplink (UL) physical level (PHY) signals transmitted by the UE 24 to its source node 12, using the information received from the source node 12. From the monitored signals, the target node 14 defects the UL channel being used by the UE 24 and measures the UL timing (step 212). After successfully identifying the UE 24, the target node 14 sends an HO acknowledgement (ACK) 214 to the source node 12. This HO ACK message may also contain the information about the target node planning to use MBSFN subframe in the $k^{th}$ frame to send HO message directly to the UE.

Subsequent to the HO Request ACK 214, the target node 14 commences transmission of one or more unicast HO messages 218 to the UE 24, which can be sent, for example, over one or more MBSFN subframes, for example, starting with the MBSFN subframe of the $k^{th}$ frame. The unicast HO messages are included in the data region of the MBSFN subframe(s). The information included in the HO messages from the target node 14 may include an RRC Connection Reconfiguration Message, UL Allocation, TA timing for the UE 24 and the like.

Interference with other nodes transmitting in the MBSFN subframes may avoided by using the techniques described below, including those referencing FIGS. 5 and 8.

In step 218, the UE 24 begins synchronization with the target node 14 based on the information contained in the HO message(s). In step 220, the UE 24 transmits and RRC Connection Reconfiguration Complete message to the target node 14 to indicate that the handover was successful. This message may be sent in the first subframe of the $(k+A)^{th}$ frame.

Figures 3, 4A:
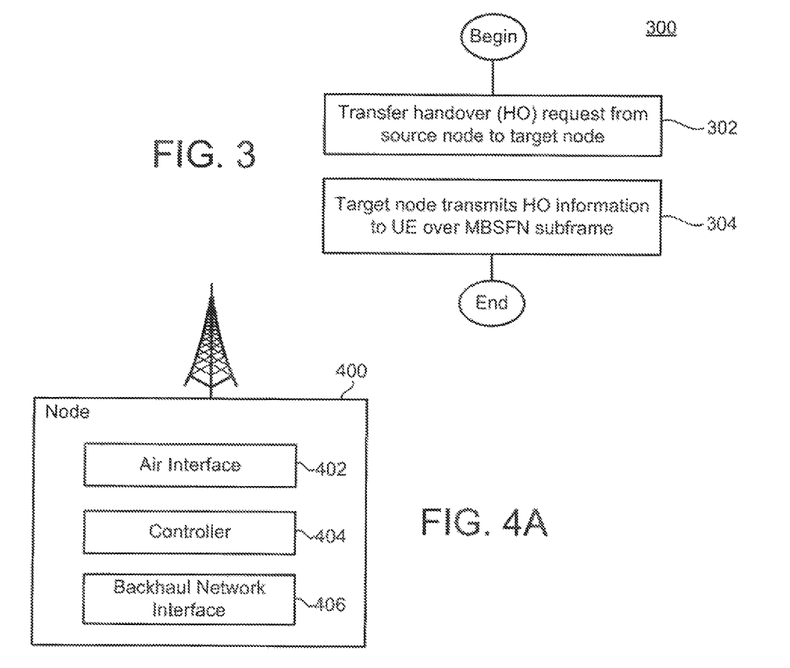
FIG. 3 is a flowchart illustrating an exemplary method of processing a handover request.
FIG. 4A is a block diagram illustrating certain components of an exemplary node usable in the system of FIG. 1.

FIG. 3 is a flowchart 300 illustrating an exemplary method of processing a handover request. In box 302, a source node currently serving a UE transfers an HO request to a target node. The HO request can be transferred using conventional procedures, including those provided by the LTE specification, and can include the information described above in connection with FIG. 2.

In box 304, in response to the HO request, the target node transmits UE-specific HO information to the UE in one or more MBSFN subframes. The UE-specific information may include a RRC Connection Reconfiguration Message, UL Allocation, TA (Timing Advance) information and the like for the UE. To avoid interference with other nodes simultaneously transmitting in the MBSFN subframes, techniques such as those described below, including those referencing FIGS. 5 and 8, may be used by the network to assign orthogonal MBSFN resources to the nodes, respectively.

FIG. 4A is a simplified block diagram illustrating certain components of an exemplary node 300 usable in the network 10 of FIG. 1. The node 400 may be an eNB, and includes, among other things, one or more antennas 408 configured to communicate with at least the UEs operating in the network, an air interface 402 for radio communication with the UEs and a backhaul network interface 408 for communicating with other devices and nodes in the network 10 over the backhaul network 34.

A controller 404 is also included in the node 400. The controller 404 may include any suitable processor, processor arrangement, memory, logic circuitry, circuit, arrangement of electronics, programming code, data or combination thereof that performs the node functions described herein as well as facilitating the overall operability of the node 400. The controller 404 controls components of the node 400 to manage the functions of the node 400. The controller 404 is connected to and/or includes a memory (not shown) which can be any suitable memory storage device capable of storing computer programming code and data. Machine-readable data and executable instructions (also referred to as applications, software, firmware, code or program) are stored in the memory and executed (or run) on the controller. All memory devices described herein may comprise any suitable combination of volatile (e.g., random access memory) or non-volatile (e.g., read-only memory) storage known in the art. The controller 404 may comprise one or more microprocessors, microcontrollers, DSPs, IP-cores, co-processors, similar devices or combinations thereof. Using known programming techniques, software stored in the memory may cause the controller 404 to operate the node 400 to achieve the node functionality described herein. For example, the controller 404 may be programmed so that the node 400 is configured to perform the source and/or target node methods and functions disclosed herein.

The node 400 may be any of the types of nodes disclosed herein, such as a fernto node, home node, macro node or the like.

Figure 4B:
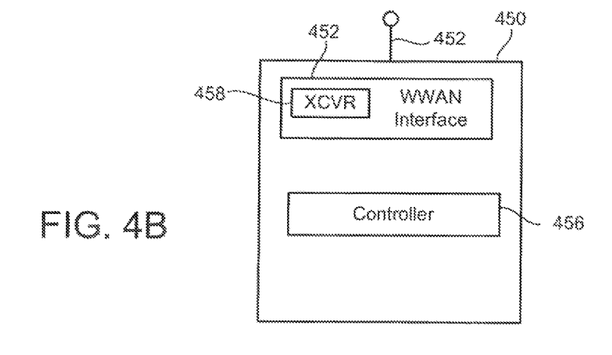
FIG. 4B is a block diagram illustrating certain components of exemplary UE usable in the system of FIG. 1.

FIG. 4B is a block diagram illustrating certain components of exemplary UE usable in the system 10 of FIG. 1. The UE 450 includes, among other things, one or more antennas 452 for permitting radio communications with the network nodes, a wireless wide-area network (WWAN) interface 452 having a transceiver (xcvr) 458. The WWAN interface 452 provides an air interface for communicating with network nodes (e.g., base stations), such as eNBs.

A controller 456 is also included in the UE 450. The controller 456 may include any suitable processor, processor arrangement, memory, logic circuitry, circuit, arrangement of electronics, programming code, data or combination thereof that performs the functions described herein as well as facilitating the overall operability of the UE 450. The controller 458 controls components of the UE to manage the functions of the UE 450. The controller 468 is connected to and/or includes a memory (not shown) which can be any suitable memory storage device capable of storing computer programming code and data. Machine-readable data and executable instructions (also referred to as applications, software, firmware, code or program) are stored in the memory and executed (or run) on the controller. All memory devices described herein may comprise any suitable combination of volatile (e.g., random access memory) or non-volatile (e.g., read-only memory) storage known in the art. The controller 458 may comprise one or more microprocessors, microcontrollers, DSPs, IP-cores, co-processors, similar devices or combinations thereof. Using known programming techniques, software stored in the memory may cause the controller 458 to operate the UE 450 to achieve the functionality described herein. Indeed, the controller 456 may be configured to perform the UE methods and functions disclosed herein, for example, at least some of the HO process steps described in connection with FIGS. 2-3.

The WWAN air interface 458 may be configured to receive one or more services from the source node 12 over radio links to the source node. The WWAN interface 458 also receives one or more MBSFN subframes from nodes in the MSBFN, including source and target nodes 12, 14. The MBSFN subframes may contain HO from the target node 14. The controller 456 is configured to complete a HO from the source node 12 to the target node 14 based on the HO information contained in the MBSFN subframe(s).

Figure 5:
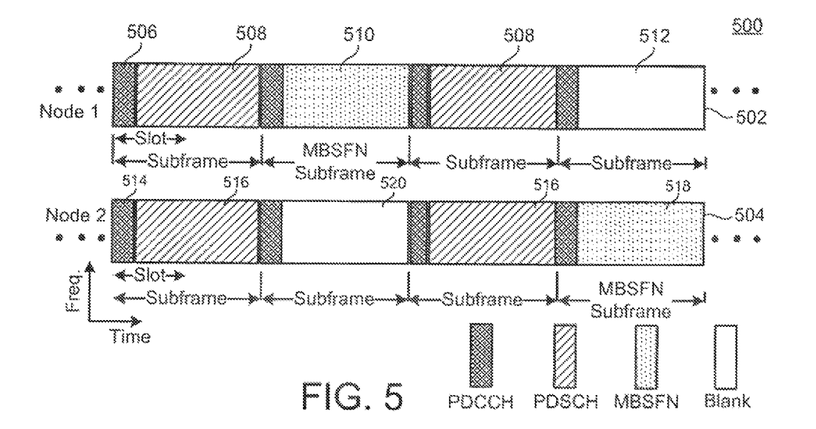
FIG. 5 is a conceptual diagram illustrating a first method of unicasting/multicastlng MBSFN subframes so as to reduce or avoid interference with other nodes transmitting MBSFN subframes.
Figure 6:
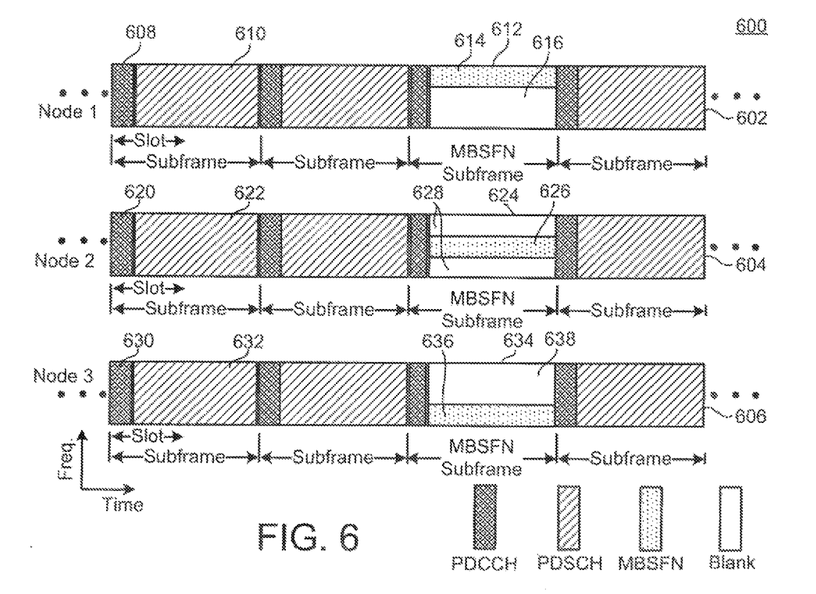
FIG. 6 is a conceptual diagram illustrating a second method of unicasting/multicasting MBSFN subframes so as to reduce or avoid interference with other nodes transmitting MBSFN subframes.

FIG. 5 is a conceptual diagram 500 illustrating a first method of unicasting/multicasting node-specific MBSFN subframes so as to reduce or avoid interference with other nodes transmitting MBSFN subframes. This method may be used in connection with the procedures depicted in FIGS. 2 and 3 and/or the operation of the network 10 of FIG. 1.

If neighboring cell nodes use the same set of resources to unicast/multicast their own data in MBSFN subframes at the same time, then they may cause interference to each other, in order to avoid interference, orthogonal sets of resources can be assigned to each cell (node). The resources may be the data region resource elements of the MBSFN subframes.

FIG. 5 shows a frequency vs. time chart that depicts an example DL frame transmission period of two neighboring nodes, Node One and Node Two, which generally transmit on the different frequency bands, with the exception of the MBSFN subframes, which are transmitted on the same frequency band. In particular, depending which node is the source node and which node is the target node, the target node may transmit the MBSFN subframes on the frequency belonging to that of the source node. Node One transmits a first frame 502 during the period. The first frame 502 includes PDCCH headers 506, PDSCH subframe data region 508, MBSFN subframe data region 510, and a blank subframe data region 512. A PDCCH 506 is included in each subframe. Node Two transmits a second frame 504 during the period. The second frame 504 includes PDCCH headers 514, PDSCH subframe data region 516, MBSFN subframe data region 518, and a blank subframe data region 520. A PDCCH 514 is included in each subframe. Although only two nodes are depicted in FIG. 5, this technique can be applied to any suitable number of nodes.

The method depicted in FIG. 5 provides that the two MBSFN subframes 510, 518 within one frame duration can be assigned as MBSFN subframes, without any overlap. The assignment of these subframes can be made by the network control entity and the nodes have a priori knowledge of the subframe assignments. To avoid interference, Node One transmits data during the first MBSFN subframe 510, while the Node Two "blanks" during the first MBSFN subframe data region. Blanking means that the node does not transmit during the period defined for the MBSFN subframe data region 510 of the first frame 502. Thus, FIG. 5 shows that Node One transmits unicast/multicast data in the first MBSFN subframe data region 510 and during the same MBSFN subframe period 510, Node Two does not transmit 520.

For the second MBSFN subframe 518, the roles of the nodes are reversed, whereby Node Two unicasts/multicasts data during the MBSFN subframe data region 518 and Node One blanks 512 during the second MBSFN subframe data region 518.

During MBSFN subframe transmissions, each node is also allowed to increase transmit power (if needed) so that their DL can reach further into the other node's coverage area. This allows neighbor nodes to serve UEs which are at the cell boundary, but still within coverage of the serving node. None of the MBSFN transmissions from different cells interfere with one another only since only one cell is transmitting data during any MBSFN subframe data region. This allows a node to unicast/multicast dedicated HO, UE signaling or cell-specific messages using the MBSFN subframe.

FIG. 6 is a conceptual diagram 600 illustrating a second method of unicasting/multicasting node-specific MBSFN subframes so as to reduce or avoid interference with other nodes transmitting MBSFN subframes. In contrast to the method of FIG. 5, the second method of FIG. 8 involves splitting each MBSFN subframe into three sets of earner sub-bands, with each carrier sub-band to being assigned to one of the three nodes. This method may be used in connection with the procedures depicted in FIGS. 2 and 3 and/or the operation of the network 10 of FIG. 1. Although only three nodes are depicted in FIG. 8, this technique can be applied to any suitable number of nodes.

FIG. 6 shows a frequency vs. time chart that depicts an exemplary DL frame transmission period of three neighboring nodes, Nodes One, Two and Three, that transmit on the different frequency channels, with the exception of MBSFN subframes. Node One transmits a first frame 602 during the period. The first frame 602 includes PDCCH headers 608, PDSCH subframe data regions 610, and an MBSFN subframe data region 612. Node Two transmits a second frame 604 during the period. The second frame 602 includes PDCCH headers 620, PDSCH subframe data regions 622, and an MBSFN subframe data region 624. Node Three transmits a third frame 606 during the period. The third frame 606 includes PDCCH headers 630, PDSCH subframe data regions 632, and an MBSFN subframe data region 634. The PDSCH and MBSFN subframes in each frame 602, 604, 606 each include a PDCCH header.

The MBSFN subframe data period is frequency divided into three carrier sub-bands 614, 626, 636. In the example shown, the first carrier sub-band 612 is assigned to Node One, the second carrier sub-band 626 is assigned to the Node Two and the third carrier sub-band 636 is assigned to the Node Three. If a carrier sub-band is not assigned to a node, then that node blanks the carrier sub-hand in order to prevent interference with other nodes. For example, Node One transmits its MBSFN subframe data on the first carrier sub-band 614 and simultaneously blanks 616 the other two carrier sub-bands. Likewise, Node Two transmits its MBSFN subframe data on the second carrier sub-band 626 and simultaneously blanks 628 the other two carrier sub-bands, while Node Three transmits its MBSFN subframe data on the third carrier sub-hand 636 and simultaneously blanks 638 the other two carrier sub-bands.

The frequency division of MBSFN subframes can be accomplished by assigning predefined sets of one or more OFDM subcarriers to each node in the MBSFN subframe data region to form the carrier sub-bands. The OFDM subcarriers in each set may be adjacent subcarrier bands. The OFDM subcarrier node assignment can be predefined by a network control entity or any other suitable means, and knowledge of the assignments can be distributed to the nodes over the network. The carrier sub-band assignments may be static or dynamic.

The following are other methods that can be deployed in the network 10 to avoid interference between neighboring nodes during MBSFN subframe unicast/multicast transmissions.

Time-domain solution: a single MBSFN subframe data region is split into time slots. For example, the MBSFN subframe data period may be split into three adjacent time slots: the first time slot is assigned to a first node, and the other two nodes blank the first time slot. The second and third time slots are similarly assigned to the second node and the third node, respectively. A node blanks the MBSFN data region during the time slots in which it is not unicasting/multicasting data. This method has the advantage that the number of blanked subframes is reduced since only one-third of an MBSFN subframe data period is allocated to each node.

The time division of MBSFN subframes can be accomplished by assigning predefined sets of one or more OFDM symbol periods in the MBSFN subframe to each node to form the carrier sub-bands. The OFDM symbol period assignments can be predefined by a network control entity or any other suitable means, and knowledge of the assignments can be distributed to the nodes over the network. The OFDM symbol period assignments may be static or dynamic.

Code-domain solution: Each node spreads its data transmission during the MBSFN subframe data region with a unique code. This requires the data to be multiplied by a spreading code (i.e., a higher chip rate). This may require more bandwidth depending on the spreading rate. This method has the advantage that no subframes need to be blanked and ail neighbor nodes can unicast/multicast MBSFN subframe data simultaneously with Utile node-to-node interference. With this solution, the UEs de-spread the data by using an assigned spreading code in order to recover the data. The spreading codes can be determined, assigned and managed by the network elements, such as a network control entity and/or the nodes, using known techniques.

The above time-domain and code-domain schemes can be set up statically or dynamically. In addition, the foregoing methods of unicasting/multicasting node-specific content in MBSFN subframes can be combined together where appropriate to, for example, increase the number of nodes that can simultaneously transmit unique data in the MBSFN subframes.

Other embodiments and modifications of this invention will occur readily to those of ordinary skill in the art in view of these teachings. Thus, the above description is illustrative and not restrictive. This invention is to be limited only by the following claims, which include all such embodiments and modifications when viewed in conjunction with the above specification and accompanying drawings. The scope of the invention should, therefore, be determined with reference to the appended claims along with their full scope of equivalents.

What is claimed is:

1. A cellular communication system, comprising:
a source node configured to transfer a handover (HO) request to a target node, the HO request corresponding to a user equipment (UE) presently being served by the source node; and
the target node configured to transmit HO information to the UE over a Multicast Broadcast Single Frequency Network (MBSFN) subframe in response to the HO request.

2. The cellular communication system of claim 1, wherein the target node is further configured to monitor at least one physical level transmission from the UE, and transmission of the HO information from the target node to the UE is based, in part, on the at least one physical level transmission.

3. The cellular communication system of claim 2, wherein the target node commences monitoring the at least one physical level transmission as a result of the target node receiving the HO request.

4. The cellular communication system of claim 2, wherein the target node is further configured to: monitor a sounding reference signal (SRS) transmitted by the UE, and measure uplink (UL) timing of the UE.

5. The cellular communication system of claim 2, wherein the target node is further configured to unicast transmit the HO information in an unassigned MBSFN subframe.

6. The cellular communication system of claim 1, wherein the target node increases its transmit power during transmission of the MBSFN subframe containing the HO information.

7. The cellular communication system of claim 1, wherein the source node is configured to: receive one or more measurement reports from the UE, and determine whether to transfer the HO request to the target node based on the measurement reports.

8. The cellular communication system of claim 1, wherein the source node does not transmit in the MBSFN subframe while the HO information is being transmitted by the target node.

9. A cellular system node, comprising:
means for monitoring at least one physical level transmission from a user equipment (UE) being served by another node; and
means for transmitting handover (HO) information to the UE over a Multicast Broadcast Single Frequency Network (MBSFN) subframe, based on the at least one physical level transmission.

10. The cellular system node of claim 9, further comprising:
means for receiving an HO request from the other node, the HO request corresponding to the UE;
means for commencing monitoring of the at least one physical level transmission from the UE as a result of receiving the HO request; and
means for transmitting HO information to the UE over the MBSFN subframe based on the at least one physical level transmission and in response to the HO request.

11. The cellular system node of claim 9, wherein the other node does not transmit in the MBSFN subframe while the HO information is being transmitted by the target node.

12. The cellular system node of claim 9, wherein the HO information is unicast transmitted in an unassigned MBSFN subframe.

13. A method of handover signaling in a cellular communication system, comprising:
transferring a handover (HO) request from a source node to a target node, the HO request corresponding to a user equipment (UE) presently being served by the source node; and
transmitting HO information from the target node to the UE over a Multicast Broadcast Single Frequency Network (MBSFN) subframe based on the HO request.

14. The method of claim 13, further comprising:
the target node monitoring at least one physical level transmission from the UE; and
transmitting HO information from the target node to the UE over a Multicast Broadcast Single Frequency Network (MBSFN) subframe based on the at least one physical level transmission and the HO request.

15. The method of claim 14, wherein monitoring the at least one physical level transmission commences as a result of the target node receiving the HO request.

16. The method of claim 14, wherein monitoring by the target node includes:
monitoring a sounding reference signal (SRS) transmitted by the UE; and
measuring uplink (UL) timing of the UE.

17. The method of claim 13, wherein the HO information is unicast transmitted in an unassigned MBSFN subsframe.

18. The method of claim 13, further comprising:
increasing transmit power of the target node during transmission of the MBSFN subframe containing the HO information.

19. The method of claim 13, further comprising:
receiving one or more measurement reports at the source node from the UE; and
the source node deciding to transfer the HO request to the target node based on the measurement reports.

20. The method of claim 13, wherein the source node does not transmit in the MBSFN subframe while the HO information is being transmitted by the target node.

* * * * *